March 16, 1937.　　　J. L. ROBBINS　　　2,074,190
INCUBATOR
Filed Jan. 8, 1932
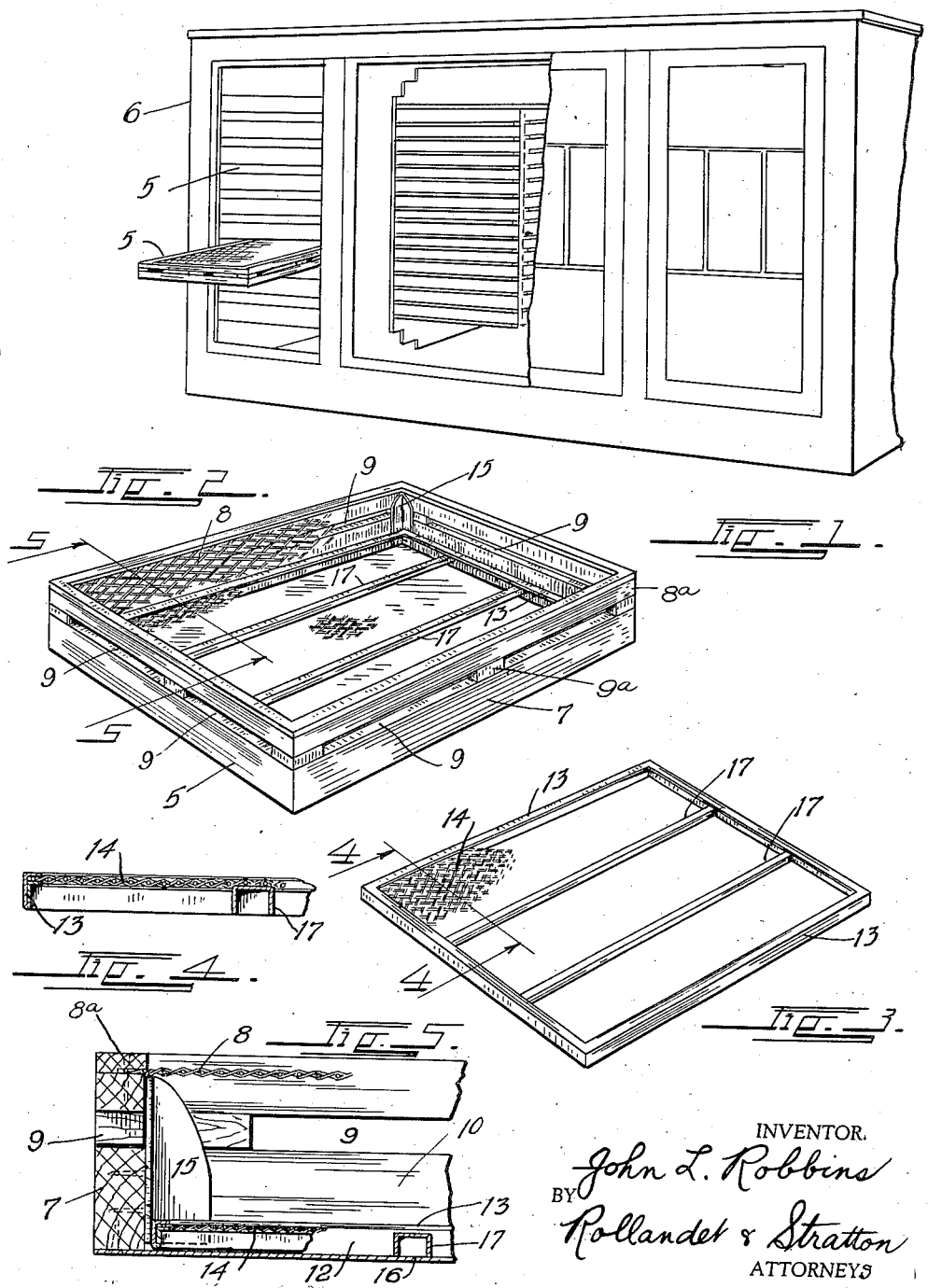
INVENTOR.
John L. Robbins
BY Rollander & Stratton
ATTORNEYS Patented Mar. 16, 1937

2,074,190

UNITED STATES PATENT OFFICE 2,074,190

INCUBATOR

John L. Robbins, Edgewater, Colo.

Application January 8, 1932, Serial No. 585,465

2 Claims. (Cl. 119—43)

My invention relates to incubators and more particularly to improvements in the construction of the hatching trays in which chicks or other species of fowls are produced from eggs, under the influence of heat. An incubator of the type particularly adapted for utilizing these hatching trays is shown in my Letters Patent No. 1,728,980, issued September 24, 1929, in which a separate hatching compartment is provided, and circulation of air through the compartment is effected by means of a fan located in the rear of said compartment. It is a well known fact that a large percentage of incubator-hatched chickens die from a disease commonly known as bacillary white diarrhea or "B. W. D.", and it is an accepted theory based upon careful observations, that the principal cause of the disease is the development of germs in the mass of shedded down and egg-particles accumulating in the trays after the chicks are hatched. This refuse matter in the trays carries the germs of the above hereditary disease which affects the young fowl and spreads rapidly among them owing to their close contact with each other.

Moreover, the circulation required in the operation of the incubator, carries the offensive matter from one tray to another thereby tending to spread the disease throughout the apparatus.

It is the primary object of the present invention to reduce the above stated detrimental conditions to a point of total elimination, by automatically confining the shedded down and small egg particles in a space separate from that occupied by the newly hatched chicks, and outside the path of the air currents in the incubator. By doing this, the chicks are kept free from contact with the refuse matter and the danger of contamination is reduced to the minimum.

I attain this object by dividing the hatching trays into two compartments by means of a foraminous false bottom. The upper compartment contains the newly hatched chicks, and is in the path of the air currents, while the lower compartment is outside said path and provides a receptacle for matter that is forced downwardly through the opening of the false bottom by the force of the air currents driven through the upper compartment.

In this manner, the space in which the young chicks are contained, is kept free from offensive refuse-matter, while the confinement of said matter in spaces outside the path of the air stream prevents its being carried from one tray into another.

An embodiment of the invention has been illustrated in the accompanying drawing in which like reference characters designate corresponding parts throughout the views and in which Figure 1 is a perspective view of an incubator with one of its hatching trays in a partially withdrawn position, Figure 2, a perspective view of one of the trays, a part of the top screen thereof having been broken away, Figure 3, a perspective view of the false bottom hereinabove referred to, Figure 4, an enlarged fragmentary section on the line 4—4 of Figure 3, and Figure 5, an enlarged fragmentary section taken on the line 5—5 of Figure 2.

The tray 5, as shown in the drawing, is one of a series contained in the casing 6 of the incubator which, as usual, is supplied with heating-means and with one or more fans or other means for the forced circulation of air through the trays.

Inasmuch as these elements of the incubator are not a part of the present invention, they have not been shown in the drawing.

The improved tray consists as usual of a rectangular frame 7 covered at its top by a framed screen 8. Below this screen the frame has openings for the ingress and egress of air streams, and it is a feature of the present invention that these openings are in the form of slots 9 extending along the four sides of the frame. These slots are preferably provided by blocks 9a which separate the frame 7 from the frame 8a in which the screen 8 is mounted.

The screen 8 in its frame 8a, is preferably made separately from the main frame upon which it is supported and it is held against lateral displacement by angle-braces 15 in the corners of the main frame which reenforce the structure. This screen confines the newly-hatched fowls in the tray, thereby preventing the mingling of newly-hatched fowls from one tray, with those from another, within the incubator.

Beneath the slots, extends the false bottom which divides the tray into upper and lower compartments 10 and 12.

The false bottom consists of a preferably metal frame 13 upon which is stretched a fine-meshed screening 14, and which is supported upon the solid bottom 16 of the tray.

Cleats 17 extending lengthwise of the frame 13 aid in the support of the screen 14.

In the operation of an incubator provided with hatching trays made in accordance with the present invention, the air streams circulating in the hatching compartment are forced to travel in substantially horizontal paths by reason of the imperforate bottoms of the trays preventing any vertical movement of air therethrough. These air streams passing through the slots 9 of the upper compartments of the trays, force the refuse-matter, consisting of shedded down and small egg particles, remaining after the chicks are hatched, through the meshes of the false bottom into the space below the same. This space being out of the path of the air streams retains the refuse-matter until the trays are cleaned and the compartment in which the newly hatched chicks are contained, is kept free from offensive matter. Contamination and spreading of disease is thus effectively prevented and the loss of fowl by death is proportionately lowered.

Another beneficial feature of the tray is that the chicks are confined in the upper compartment to prevent their moving from one tray to another.

What I claim and desire to secure by Letters Patent is:

1. A hatching tray for incubators comprising a frame, means dividing the interior of the frame into an upper hatching compartment and a lower refuse receptacle, a screened frame removably supported on the first mentioned frame, and means supporting the screened frame above and in spaced relation to the first-mentioned frame to provide openings for the circulation of air.

2. A hatching tray for incubators, comprising, a frame having an imperforate bottom, a foraminated false bottom located above and spaced from the imperforate bottom, the foraminated bottom dividing the tray into an upper hatching and a lower refuse compartment, the sides of the frame having openings communicating with the upper compartment only, for the passage of air through the upper compartment, a screened frame removably supported on the first-mentioned frame, and means comprising upright members secured to one frame and engaging the other frame for holding the two frames from relative lateral movement.

JOHN L. ROBBINS.